3,331,801
COATING COMPOSITIONS OF POLYMER DISPERSIONS IN MIXTURES OF HIGH BOILING AND LOW BOILING LIQUIDS
Desmond Wilfrid John Osmond, Iver Heath, Edward Spencer George Simpson, Maidenhead, and Michael John Waghorn, Stoke Poges, England, assignors to Imperial Chemical Industries Limited, London, England, a corporation of Great Britain
No Drawing. Filed Nov. 20, 1964, Ser. No. 412,833
Claims priority, application Great Britain, Nov. 25, 1963, 46,439/63
7 Claims. (Cl. 260—31.2)

This invention relates to coating compositions based on dispersions of film-forming polymer particles in an organic liquid which is a non-solvent for the polymer. In particular it relates to such compositions suitable for application by spray gun.

Whilst coating compositions based on dispersions of film-forming polymers have certain potential advantages over those based on solutions of film-forming polymers, e.g. the possibility of preparing coating compositions containing a higher proportion of film-forming polymer without an unmanageable increase in viscosity, they have previously suffered from the disadvantage that the coating produced from such compositions compared unfavourably in respect of finished appearance, e.g. smoothness and gloss.

Where the dispersions are made by grinding preformed polymer in organic liquid in the presence of a conventional stabilising agent it is impossible to obtain a high degree of stabilisation with the result that there is considerable particle-to-particle interaction in the dispersion leading to the dispersion being false-bodied or thixotropic. Whilst this is an advantage, to some extent, in that it makes it easier to apply a thick coating of compositions to vertical surfaces without runs or sags forming in the coating, it is also disadvantageous in that the relatively poor dispersion of the particles makes it impossible to achieve a high level of gloss.

On the other hand, where the dispersions are made by new techniques, such as dispersion polymerisation, suitable choice of stabiliser can result in relatively non-flocculated dispersions. When such highly stable dispersions are used in coating compositions, the freedom from flocculation results in the polymer particles packing together very well on evaporation of the organic liquid to give films which are much less dull and which require much less polishing, in some circumstances none at all, to achieve a high gloss. There is a disadvantage, however, in that the substantially non-flocculated dispersions are so fluid that it is difficult to avoid runs and sags in coatings on vertical surfaces.

We have now found that, on suitable formulation, there can be produced dispersion-type coating compositions having improved application characteristics.

For spray application, coating compositions should have the following characteristics:

(i) In order to achieve good atomisation in the spray gun they should be of low viscosity;

(ii) On reaching the article being coated, the particles of the composition in the spray should flow together to form a smooth film, but the resulting film should not be so free-flowing that runs or sags are formed on vertical surfaces.

A major advantage of substantially non-flocculated dispersions of synthetic polymer is that they can be of low viscosity even when they contain a high proportion, say as high at 50%–60% by volume, of dispersed solids. The first characteristic, therefore, is much more readily achieved in the case of compositions based on these dispersions of polymer than in the case of compositions based on solution of polymers.

For the sprayed coating composition to flow at all when it reaches the surface to be coated it must still contain at that stage more than sufficient liquid to fill the voids between the solid particles of the dispersion. In practice the newly-sprayed wet coating must contain liquid in the proportion of at least 1:1.6 by volume of the solids, preferably in the range of 1:1 to 2:1 by volume. This liquid must necessarily be a high boiling liquid which does not evaporate during the spraying process. In order to be sprayable the coating composition will initially contain more liquid than this, but the liquid in excess of that required in the newly-sprayed wet coating should be low boiling organic liquid which evaporates during the passage of the sprayed particles to the surface to be coated.

The present invention takes advantage of this loss of low boiling organic liquids during the spraying process to achieve improved application characteristics. In this invention the organic liquid of a dispersion-type coating composition consists essentially of a mixture of high boiling liquid and low boiling liquid in which the high boiling liquid is present in a proportion, relative to the solid content of the composition, of at least 1:1.6 by volume, the high boiling liquid having a solvating action on the dispersed polymer at room temperature and both the low boiling liquid and the mixture thereof with the high boiling liquid being a non-solvent for the dispersed polymer at room temperature.

Preferably, the proportion of high boiling organic liquid in the coating composition is from 1:1 to 2:1 by volume of the solids of the composition. The term "solids" includes not only the dispersed film-forming polymer, but also the pigments, fillers, etc., together with plasticiser where this is present in the film-forming polymer particles.

It is more convenient if the high boiling liquid is a mixture of a strong solvent for the dispersed polymer, a non-solvent and optionally a plasticiser, the high boiling liquid as a whole being a weak solvent for the polymer. The solvating action of the mixture is then readily adjustable to meet the specific conditions in which the composition is being sprayed simply by variation of the relative proportions of its solvent and non-solvent constituents. Preferably, the proportion of solvent to non-solvent in the high boiling liquid is from 1:3 to 3:1 by volume, the most suitable proportions being dependent on the nature of the liquids and the dispersed polymer.

In such a coating composition, the organic liquid mixture "in toto" is a non-solvent for the dispersed polymer at room temperature and the dispersion is stable. At this stage, the tendency of the solvent in the mixture to attack the dispersed polymer is suppressed or swamped by the presence of the non-solvent which forms a much higher proportion of the liquid mixture in which the polymer is dispersed. During spraying, the low boiling non-solvent liquid evaporates and in the newly-sprayed wet coating on the surface being sprayed, the concentration of solvent in the high boiling liquid surrounding the dispersed polymer is higher and its solvating action is no longer suppressed. Even in the preferred embodiment, where part of the high boiling liquid is non-solvent, this is not such as to suppress completely the action of the solvent; it merely provides a convenient means of controlling and modifying it. At that stage, the solvent in the high boiling liquid attacks the disperse polymer particles of the wet film at room temperature. The resultant solvating action, i.e. swelling or slow partial solution of the disperse polymer, increases the viscosity of the sprayed composition, thus setting it and reducing its tendency to run or sag, and, as an additional effect, improving the integration of the polymer particles into a continuous film.

It will have been noted that the terms "solvent" and "non-solvent" have been related to solvating action, or lack of it, at room temperature. In respect of the high boiling liquid in particular it is contemplated that what has been described above as a "non-solvent" constituent may, in fact, be a solvent for the polymer when the sprayed coating is stoved. This is particularly the case in respect of plasticizers which may be present in the liquid phase of the coating composition. In a preferred embodiment of the invention, therefore, the high boiling liquid is a mixture of liquid which is a solvent for the polymer at room temperature and liquid which is a non-solvent at room temperature but a solvent at stoving temperature. In this way, coalescence and integration of the polymer particles at stoving temperature is improved.

The terms "strong solvent," "weak solvent" and "non-solvent" used above will be well understood by those skilled in the art. Even though there are no precisely determinable dividing lines between the three groups of liquids, the significance of the terms in the practical application of this invention will be quite clear and may be illustrated by the following simple test. On a thick sheet of the film-forming polymer used in the coating composition place separate drops of strong solvent, weak solvent and non-solvent. In the case of the strong solvent it will, in a matter of two or three minutes, have dissolved the underlying polymer sheet to produce a small area of viscous sticky polymer solution. In the case of the weak solvent much of it will remain as such on the polymer sheet even after several minutes and its removal by wiping will leave a softened, tacky area of swollen, solvated polymer. In the case of the non-solvent, there will be no significant attack and if the drop is wiped off after several minutes there will be no visible effect on the polymer sheet.

The proportion of low-boiling liquid in the mixture is not critical but should, of course, be at least sufficient to bring the composition to sprayable viscosity. A suitable proportion is between 30%–50% by volume of the composition. More may be added to control the application characteristics of the composition being sprayed.

By low boiling organic liquid we mean one which, when tested by spraying under the operating conditions under which the article is to be coated, is evaporated by the spray application; i.e. the article sprayed with the low boiling liquid is found on examination immediately after spraying to be dry. In normal conditions a suitable liquid is, for example, a hydrocarbon boiling in the range 60–120° C.

By high boiling organic liquid we mean one which suffers substantially no loss by evaporation on spray application. A simple test for this is to spray-apply a mixture of the liquid and a nonvolatile liquid plasticiser and analyse a sample of the mixture as deposited on the article being sprayed. If the proportion of liquid to plasticiser is substantially unchanged then the liquid is suitable as a high boiling liquid for the purpose of this invention. In normal conditions a suitable organic liquid is one boiling in a range above 150° C.

If the coated article is to be stoved shortly after coating, then for a stoving temperature of 127° C., a liquid boiling in the range between 150° C. and 270° C., the major part in the range 180° C.–250° C. is preferred. If the coated article is not to be stoved for some time after spraying, there is a possibility that, on standing, the proportion of high boiling liquid in the sprayed film may fall below the critical level as a result of slow evaporation. It is, therefore, a preferred additional feature of our invention that the coating composition should contain a liquid which is non-volatile at room temperature in a proportion, relative to the solids, of at least 1:1.6 by volume. This non-volatile liquid may be plasticiser for the polymer, and so may be a permanent component of the dry film, or it may be a very high boiling liquid which is evaporated only during the subsequent stoving, or it may be a combination of both. In any case, it is to be regarded as high boiling liquid as previously defined.

The present invention may be applied broadly to coating compositions based on dispersions of polymer in organic liquid. Typical suitable polymers are those of styrene, vinyl toluene, divinyl benzene, diisopropenyl benzene, allyl acetate, diallyl adipate, acrylonitrile, vinyl chloride, vinylidene chloride, vinyl propionate, vinyl acetate, and vinyl stearate; polymers particularly suitable for use in coating compositions are acrylate polymers by which we mean polymers and copolymers comprising acrylic or methacrylic acid or an ester, amide or nitrile of such an acid. Typical materials which are suitable for use in this invention include polymers of acrylates and methacrylates of aliphatic alcohols such as methyl, ethyl, octyl, lauryl and natural fat alcohols. The preferred monomers for use in the production of polymers for the preparation of coating compositions according to this invention are methyl methacrylate, β-ethoxy ethyl methacrylate, ethyl acrylate, methacrylic acid and acrylic acid. Combinations of these monomers may be used, a preferred one being a combination of methyl methacrylate with up to 10% by weight of methacrylic acid.

The nature of the organic liquids used in the coating composition will depend on the nature of the dispersed film-forming polymer. A non-solvent organic liquid will be of different polarity to that of the dispersed polymer whereas a solvent organic liquid will be of a similar polarity. For example, in the case of a polar synthetic polymer such as methyl methacrylate, non-solvents will be non-polar organic liquids such as aliphatic hydrocarbons, whereas solvents will be polar organic liquids such as esters, ethers and ketones. On the other hand, in the case of a non-polar synthetic polymer such as polyisobutylene, non-solvents will be polar organic liquids such as alcohols and esters, whereas solvents will be non-polar organic liquids such as aromatic hydrocarbons.

The invention is particularly applicable to substantially non-flocculated polymer dispersions stabilised by a material, such as a copolymer, comprising one polymeric constituent which is solvated by the organic liquid and another polymeric constituent of different polarity which preferentially becomes associated with the disperse polymer. Association of the second-mentioned constituent with the copolymer in the disperse particles results in the stabilising solvated constituent of the copolymer being attached to the particles.

The earlier described connection between relative polarity of liquid and polymer and solvent-power of the liquid, also explains the use in such non-flocculated dispersions of a stabilising copolymer which contains two types of polymeric constituents of different polarities. The one polymeric constituent which is to be solvated by the organic liquid of the dispersion must be of similar polarity to that of the organic liquid whereas the other polymeric constituent which is preferentially associated with the polymer particle must be of polarity nearer to that of the insoluble polymer than that of the organic liquid.

One method of making such dispersions is by precipitating the polymer in the organic liquid containing an appropriate stabilising copolymer. For example, the polymer to be dispersed and the stabilising copolymer may be preformed in solution and then added to the organic liquid in which the polymer is precipitated. Alternatively, the polymer to be dispersed may be formed in the non-solvent organic liquid of the dispersion by polymerising monomer in the organic liquid in the presence of a preformed stabilising copolymer. As a further alternative the polymer and stabilising copolymer may both be formed in situ by polymerising monomer and copolymerisable solvated polymeric constituent in the organic liquid in which the resulting polymer is to be dispersed. Polymerisation of the mixture results in the formation of insoluble polymer and of a stabilising copolymer of the solvated polymeric constituent and part of the monomer, the copolymerised monomer providing the other polymeric constituent of different polarity which is associated with the disperse polymer particles.

In the case of polar polymers such as polymers and copolymers of lower esters of acrylic or methacrylic acid and polymers and copolymers of vinyl acetate, suitable classes of high boiling solvent and examples of each class are:

(1) Esters, for example:
    n-butyl acetate
    n-butyl lactate
    ethyl benzoate
    ethylene glycol diacetate
    2-ethoxy ethyl acetate
    2-(2-butoxyethoxy) ethyl acetate
    cyclohexyl acetate
(2) Ketones, for example:
    ethyl n-butyl ketone
    cyclohexanone
    isophorone
    methoxyhexanone
    methyl hexanone
(3) Alcohols, for example:
    3,5,5-trimethyl hexanol
    benzyl alcohol
(4) Ethers, for example:
    diethylene glycol diethyl ether
    ethylene glycol di-n-butyl ether
    diethylene glycol di-n-butyl ether
(5) Ether-alcohols, for example:
    2-methoxyethanol
    2-ethoxyethanol
    2-butoxy ethanol
(6) Miscellaneous, for example:
    dimethyl formamide
    1-nitropropane Where the high boiling solvent is used in admixture with a high boiling non-solvent, its boiling point may be slightly lower than 150° C. For example, even when the solvent is, say, butyl acetate (boiling point 126° C.) it will be found that little of this is evaporated before the sprayed coating reaches the surface to be coated.

A suitable high boiling non-solvent organic liquid is an aliphatic hydrocarbon, e.g. a kerosene boiling in the range 180–250° C. A suitable very high boiling non-solvent liquid substantially non-volatile at room temperature is an aliphatic hydrocarbon boiling in the range 250–290° C.

Liquid plasticisers suitable for use with acrylate polymers include phthalic and adipic esters of aliphatic and aromatic alcohols containing from 4–10 carbon atoms. At room temperature the rate of attack of these particular plasticisers on the polymer is so slow that they may be regarded as non-solvents.

A suitable low boiling non-solvent organic liquid which substantially completely evaporates during spraying is aliphatic hydrocarbon boiling in the range 60–100° C., such a hydrocarbon being commercially available under the name Special Boiling Petroleum 2.

The invention is illustrated by the following examples in which all parts are by weight.

*Example 1*

164 parts of titanium dioxide were ground in a ball mill together with 204 parts of plasticiser and pigment dispersing agent. After 16 hours the mill was discharged and to the dispersion were added 126 parts of a low boiling aliphatic hydrocarbon (boiling range 70–90° C.) followed by 500 parts of a dispersion of polymethyl methacrylate in the same low boiling aliphatic hydrocarbon.

Nine parts by weight of the resulting pigmented dispersion were further diluted before application with one part of the following mixture:

|   | Parts |
|---|---|
| Aliphatic hydrocarbon (boiling range 230–250° C.) | 4 |
| Aliphatic hydrocarbon (boiling range 150–200° C.) | 2 |
| 2-(2-butoxyethoxy) ethyl acetate | 3 |

The diluted composition when sprayed onto an undercoated steel panel flowed out to give a smooth film free from sags and runs at a wet film thickness of 0.004 inch. On stoving for 30 minutes at 127° C. the resulting film was hard, smooth and glossy.

*Example 2*

A dispersion of polymethyl methacrylate in a low boiling aliphatic hydrocarbon (boiling range 70–90° C.) was pigmented to a deep blue colour using phthalocyanine blue with small amounts of titanium dioxide and carbon black.

Nine parts of this composition were diluted with one part of the following mixture:

|   | Parts |
|---|---|
| Aliphatic hydrocarbon (boiling range 230–250° C.) | 2 |
| n-Butyl acetate | 1 |

When sprayed onto an undercoated steel panel excellent flow was obtained without the occurrence of sags or runs at a wet film thickness of 0.0035 inch. On stoving for 30 minutes at 127° C. the resulting film had good gloss and was free from mottle and other surface imperfections.

*Example 3*

A further portion of the pigmented dispersion described in Example 1 was diluted before application in the ratio of nine parts finish to one part thinner by weight with the following mixture:

|   | Parts |
|---|---|
| Aliphatic hydrocarbon (boiling range 230–250° C.) | 2 |
| 3,5,5-trimethyl hexanol | 1 |

The diluted composition was sprayed on an undercoated steel panel and gave excellent flow without the occurrence of runs or sags. On stoving at 127° C. for 30 minutes a hard, glossy, film was obtained which was free from surface imperfections.

*Example 4*

To 100 parts of a dispersion of 60.5 parts by weight of plasticized polyvinyl acetate (9% by weight butyl benzyl phthalate plasticiser) in 22.5 parts of aliphatic hydrocarbon (boiling range 170–210° C.) and 22.5 parts of aliphatic hydrocarbon (boiling range 70–90° C.) were added 15 parts of aliphatic hydrocarbon (boiling range 170–210° C.) and 5.5 parts benzyl alcohol. The diluted composition, when sprayed onto a chipboard panel, gave a smooth film free from runs and sags. The film dried at room temperature to a thickness of 0.003 inch and was tough, clear and glossy.

We claim:
1. A coating composition adapted for spraying onto articles comprising a dispersion non-thixotropic, non-flocculated of dispersed particles of film forming polymer in an organic liquid in which said dispersed particles are insoluble,
    said organic liquid consisting essentially of a mixture of (1) a high-boiling organic liquid and (2) a low-boiling organic liquid,
    said high-boiling liquid (1) having a boiling point above 150° C., suffering substantially no loss by evaporation on spray application under normal operating conditions such that when a mixture of said high-boiling organic liquid and a nonvolatile liquid plasticizer is spray applied, the liquid deposited will boiling liquid to nonvolatile plasticizer as the liquid contain substantially the same proportion of high- mixture which is sprayed, and having a solvating action on said dispersed particles at room temperature such that it at least swells said particles, the amount of said high boiling liquid (1), relative to the solid content of the composition, being at least 1:1.6 by volume.

said low boiling organic liquid, when spray applied under normal operating conditions to an article to be coated, being evaporated by the application such that the sprayed article is found on examination immediately after spraying to be dry, having a boiling point in the range 60 to 120° C., and being present in an amount at least sufficient that the total organic liquid which consists essentially of said high and low-boiling organic liquids is a non-solvent for said dispersed particles, whereby said total organic liquid does not swell said film forming polymer at room temperature notwithstanding the solvating action of the high-boiling component (1).

2. A coating composition as claimed in claim 1 in which the proportion of high boiling organic liquid in the coating composition is from 1:1 to 2:1 by volume of the solids of the composition.

3. A coating composition as claimed in claim 1 in which the high boiling liquid is a mixture of a strong solvent for the dispersed polymer and a non-solvent, the high boiling liquid as a whole being a weak solvent for the polymer.

4. A coating composition as claimed in claim 3 in which the proportion of solvent to non-solvent in the high boiling liquid is from 1:3 to 3:1 by volume.

5. A coating composition as claimed in claim 3 suitable for spray application followed by stoving at an elevated temperature in which the high boiling liquid is a mixture of liquid which is a solvent for the polymer at room temperature and liquid which is a non-solvent at room temperature but a solvent at stoving temperature.

6. A coating composition as claimed in claim 1 in which the mixture of organic liquids contains a liquid which is non-volatile at room temperature in a proportion, relative to the solids, of at least 1:1.6 by volume.

7. A coating composition as claimed in claim 1 in which the low boiling liquid boils in the range 60–120° C. and the high boiling liquid boils at about 150° C. to 270° C.

References Cited

UNITED STATES PATENTS

| | | | |
|---|---|---|---|
| 2,901,454 | 8/1959 | Stewart | 260—89.5 |
| 3,095,388 | 6/1963 | Osmond et al. | 260—32.8 |

FOREIGN PATENTS 617,516  11/1962  Belgium.

JOSEPH L. SCHOFER, *Primary Examiner.*

H. WONG, JR., *Assistant Examiner.*

UNITED STATES PATENT OFFICE
CERTIFICATE OF CORRECTION

Patent No. 3,331,801                      July 18, 1967

Desmond Wilfrid John Osmond et al.

It is hereby certified that error appears in the above numbered patent requiring correction and that the said Letters Patent should read as corrected below.

Column 6, lines 60 and 61, for "dispersion non-thixotropic, non-flocculated" read -- non-thixotropic, non-flocculated dispersion--; lines 74 and 75, strike out "boiling liquid to nonvolatile plasticizer as the liquid contain substantially the same proportion of high-" and insert instead -- contain substantially the same proportion of high-boiling liquid to nonvolatile plasticizer as the liquid --.

Signed and sealed this 29th day of April 1969.

(SEAL)
Attest:

Edward M. Fletcher, Jr.
Attesting Officer

EDWARD J. BRENNER
Commissioner of Patents